(12) United States Patent
Eguchi et al.

(10) Patent No.: US 10,964,944 B2
(45) Date of Patent: *Mar. 30, 2021

(54) LITHIUM-CONTAINING COMPOSITE OXIDE, CATHODE ACTIVE MATERIAL, POSITIVE ELECTRODE FOR LITHIUM ION SECONDARY BATTERY, AND LITHIUM ION SECONDARY BATTERY

(71) Applicant: SUMITOMO CHEMICAL CO., LTD., Tokyo (JP)

(72) Inventors: Ryo Eguchi, Chiyoda-ku (JP); Takeshi Kawasato, Chiyoda-ku (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,269

(22) Filed: Jun. 3, 2019

(65) Prior Publication Data

US 2019/0296350 A1    Sep. 26, 2019

Related U.S. Application Data

(63) Continuation of application No. 15/165,163, filed on May 26, 2016, now Pat. No. 10,355,276.

(30) Foreign Application Priority Data

Jun. 10, 2015   (JP) ................. 2015-117266

(51) Int. Cl.
| | | |
|---|---|---|
| *H01M 4/00* | (2006.01) |
| *H01M 4/525* | (2010.01) |
| *H01M 4/505* | (2010.01) |
| *C01G 45/12* | (2006.01) |
| *C01G 51/00* | (2006.01) |
| *C01G 53/00* | (2006.01) |
| *H01M 4/485* | (2010.01) |
| *H01M 10/052* | (2010.01) |
| *H01M 4/02* | (2006.01) |

(52) U.S. Cl.
CPC ........ *H01M 4/525* (2013.01); *C01G 45/1228* (2013.01); *C01G 51/50* (2013.01); *C01G 53/50* (2013.01); *H01M 4/505* (2013.01); *C01P 2004/61* (2013.01); *C01P 2004/80* (2013.01); *C01P 2004/84* (2013.01); *C01P 2006/11* (2013.01); *C01P 2006/12* (2013.01); *H01M 4/485* (2013.01); *H01M 10/052* (2013.01); *H01M 2004/021* (2013.01)

(58) Field of Classification Search
CPC ................. H01M 4/525; H01M 4/505; H01M 2004/021; H01M 4/485; C01G 51/50; C01G 53/50; C01G 45/1228
See application file for complete search history.

(56) References Cited

U.S. PATENT DOCUMENTS

| | | | |
|---|---|---|---|
| 8,192,715 B2 | 6/2012 | Kawasato | |
| 8,795,896 B2 | 8/2014 | Kawasato | |
| 10,355,276 B2* | 7/2019 | Eguchi | ............... C01G 45/1228 |
| 2004/0234857 A1 | 11/2004 | Shiozaki | |
| 2013/0327979 A1 | 12/2013 | Modeki | |
| 2014/0113193 A1* | 4/2014 | Tsunozaki | ........... H01M 10/052 |
| | | | 429/220 |
| 2014/0377660 A1 | 12/2014 | Fukui et al. | |
| 2016/0056462 A1 | 2/2016 | Sakai et al. | |

FOREIGN PATENT DOCUMENTS

| | | |
|---|---|---|
| CN | 102760884 A | 10/2012 |
| JP | 2008-120679 A | 5/2008 |
| JP | 2011-96650 | 5/2011 |
| JP | 2013-147416 A | 8/2013 |
| JP | 2013-211239 | 10/2013 |
| JP | 2014-529868 A | 11/2014 |
| WO | WO 2012/111614 A1 | 8/2012 |
| WO | WO 2014/069469 A1 | 5/2014 |
| WO | WO 2014/156992 A1 | 10/2014 |
| WO | WO 2014/192759 A1 | 12/2014 |
| WO | WO 2014/208453 A1 | 12/2014 |
| WO | WO 2015/059778 A1 | 4/2015 |
| WO | WO 2015/064478 A1 | 5/2015 |
| WO | WO 2015/108163 A1 | 7/2015 |

\* cited by examiner

*Primary Examiner* — Nicholas P D'Aniello
(74) *Attorney, Agent, or Firm* — Oblon, McClelland, Maier & Neustadt, L.L.P.

(57) ABSTRACT

To provide a lithium-containing composite oxide capable of obtaining a lithium ion secondary battery having a large discharge capacity wherein the deterioration of the discharge voltage due to repetition of a charge and discharge cycle is suppressed, a cathode active material, a positive electrode for a lithium ion secondary battery and a lithium ion secondary battery. A lithium-containing composite oxide, which is represented by the formula I:

$$Li_aNi_bCo_cMn_dM_eO_2 \qquad \text{Formula I,}$$

wherein M is at least one member selected from the group consisting of Na, Mg, Ti, Zr, Al, W and Mo, $a+b+c+d+e=2$, $1.1 \le a/(b+c+d+e) \le 1.4$, $0.2 \le b/(b+c+d+e) \le 0.5$, $0 \le c/(b+c+d+e) \le 0.25$, $0.3 \le d/(b+c+d+e) \le 0.6$, and $0 \le e/(b+c+d+e) \le 0.1$, and wherein the valence of Ni is from 2.15 to 2.45.

20 Claims, No Drawings

LITHIUM-CONTAINING COMPOSITE OXIDE, CATHODE ACTIVE MATERIAL, POSITIVE ELECTRODE FOR LITHIUM ION SECONDARY BATTERY, AND LITHIUM ION SECONDARY BATTERY

CROSS REFERENCE TO RELATED APPLICATIONS

This application is a continuation of U.S. patent application Ser. No. 15/165,163, filed May 26, 2016, the disclosure of which is incorporated herein by reference in its entirety. This application claims priority to Japanese Application No. 2015-117266, filed Jun. 10, 2015, the disclosure of which is incorporated herein by reference in its entirety.

FIELD OF INVENTION

The present invention relates to a lithium-containing composite oxide, a cathode active material, a positive electrode for a lithium ion secondary battery, and a lithium ion secondary battery.

BACKGROUND OF INVENTION

As a cathode active material contained in a positive electrode of a lithium ion secondary battery, a lithium-containing composite oxide, particularly $LiCoO_2$, is well known. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

As a cathode active material which may be able to further increase the discharge capacity of a lithium ion secondary battery, a cathode active material having high Li and Mn contents i.e. a so-called lithium rich cathode active material has attracted attention. As a lithium rich cathode active material capable of obtaining a lithium secondary battery having a large discharge capacity, the followings have been proposed.

(1) A cathode active material particulate powder which is made of a compound having a crystal structure with space group R-3m and a crystal structure with space group C2/m, wherein the compound is a composite oxide comprising at least Li, Mn and boron and Co and/or Ni, the relative intensity ratio (a)/(b) of (a) the intensity of the maximum diffraction peak at 2θ=20.8±1° in the figure of the X-ray powder diffraction using a Cu-Kα ray of the cathode active material particulate powder to (b) the intensity of the maximum diffraction peak at 2θ=18.6±1°, is from 0.02 to 0.5, the content of Mn of the cathode active material particulate powder is at least 0.55 in Mn/(Ni+Co+Mn) by the molar ratio, and from 0.001 to 3 wt % of boron is contained (Patent Document 1).

(2) A cathode active material particulate powder made of a compound having at least a crystal structure with space group R-3m and a crystal structure with space group C2/m, wherein the compound is a composite oxide comprising at least Li, Mn, an element A (at least one element selected from the group consisting of Si, Zr and Y) and Co and/or Ni, the relative intensity ratio (a)/(b) of (a) the intensity of the maximum diffraction peak at 2θ=20.8±1° in the figure of the X-ray powder diffraction using a Cu-Kα ray of the cathode active material particulate powder to (b) the intensity of the maximum diffraction peak at 2θ=18.6±1°, is from 0.02 to 0.2, the content of Mn of the cathode active material particulate powder is at least 0.55 in (Mn/(Ni+Co+Mn)) by the molar ratio, from 0.03 to 5 wt % of the element A is contained, the tap density is from 0.8 to 2.4 g/cc, and the compressed density is from 2.0 to 3.1 g/cc (Patent Document 2).

PRIOR ART DOCUMENTS

Patent Documents

Patent Document 1: JP-A-2011-096650
Patent Document 2: JP-A-2013-211239

SUMMARY OF INVENTION

Technical Problem

However, even with the lithium rich cathode active material of (1) or (2), the discharge capacity of the lithium ion secondary battery is insufficient. It is desired to further improve the discharge capacity in order to make the energy density of lithium ion secondary battery higher.

Further, the lithium ion secondary battery using the lithium rich cathode active material has a problem such that when a charge and discharge cycle is repeated, the discharge voltage decreases. If the discharge voltage of the lithium ion secondary battery is lowered, the energy density is lowered. Thus, it is desired to suppress the deterioration of the discharge voltage due to repetition of the charge and discharge cycle.

It is an object of the present invention to provide a lithium-containing composite oxide capable of obtaining a lithium ion secondary battery having a large discharge capacity wherein the deterioration of the discharge voltage due to repetition of the charge and discharge cycle can be suppressed, a cathode active material and a positive electrode for a lithium ion secondary battery; and a lithium ion secondary battery having a large discharge capacity wherein the deterioration of the discharge voltage due to repetition of the charge and discharge cycle is suppressed.

Solution to Problem

The present invention provides the following embodiments.
(1) A lithium-containing composite oxide, which is represented by the following formula I:

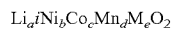 Formula I, wherein M is at least one member selected from the group consisting of Na, Mg, Ti, Zr, Al, W and Mo,
a+b+c+d+e=2,
1.1≤a/(b+c+d+e)≤1.4,
0.2≤b/(b+c+d+e)≤0.5,
0≤c/(b+c+d+e)≤0.25,
0.3≤d/(b+c+d+e)≤0.6, and
0≤e/(b+c+d+e)≤0.1, and
wherein the valence of Ni is from 2.15 to 2.45, when the valence of Li is 1, the valence of Co is 3, the valence of Mn is 4, the valence of Na is 1, the valence of Mg is 2, the valence of Ti is 4, the valence of Zr is 4, the valence of Al is 3, the valence of W is 6, the valence of Mo is 6, and the valence of oxygen (O) is −2.
(2) The lithium-containing composite oxide according to the above (1), wherein in the formula I, 0.05≤c/(b+c+d+e)≤0.25

(3) The lithium-containing composite oxide according to the above (1) or (2), wherein in the formula I, M is at least one member selected from the group consisting of Ti, Zr and Al.
(4) A cathode active material comprising the lithium-containing composite oxide as defined in any one of the above (1) to (3).
(5) The cathode active material according to the above (4), which has a coating made of a compound containing at least one member selected from the group consisting of Zr, Ti, Al and F on a surface of the lithium-containing composite oxide.
(6) The cathode active material according to the above (4) or (5), wherein the $D_{50}$ of the cathode active material is from 3 to 10 μm.
(7) The cathode active material according to any one of the above (4) to (6), wherein the specific surface area of the cathode active material is from 0.5 to 5 m$^2$/g.
(8) A positive electrode for a lithium ion secondary battery, which comprises the cathode active material as defined in any one of the above (4) to (7), an electrically conductive material and a binder.
(9) A lithium ion secondary battery, which comprises the positive electrode for a lithium ion secondary battery as defined in the above (8), a negative electrode and a non-aqueous electrolyte.

Advantageous Effects of Invention

By the lithium-containing composite oxide of the present invention, it is possible to obtain a lithium ion secondary battery having a large discharge capacity wherein the deterioration of the discharge voltage due to repetition of a charge and discharge cycle is suppressed.

By the cathode active material of the present invention, it is possible to obtain a lithium ion secondary battery having a large discharge capacity wherein the deterioration of the discharge voltage due to repetition of a charge and discharge cycle is suppressed.

By the positive electrode for a lithium ion secondary battery of the present invention, it is possible to obtain a lithium ion secondary battery having a large discharge capacity wherein the deterioration of the discharge voltage due to repetition of a charge and discharge cycle is suppressed.

The lithium ion secondary battery of the present invention is one having a large discharge capacity wherein the deterioration of the discharge voltage due to repetition of a charge and discharge cycle is suppressed.

DETAILED DESCRIPTION OF INVENTION

The following definitions of terms are applied to this specification including Claims.

The "valence of Ni" is a valence of Ni calculated so as to satisfy an electrically neutral condition of the formula I, when the valences of respective elements of Li, Co, Mn and M (at least one member selected from the group consisting of Na, Mg, Ti, Zr, Al, W and Mo) in the formula I ($Li_aNi_bCo_cMn_dM_eO_2$) are fixed to the most stable oxidation numbers, and the valence of oxygen (O) is fixed to −2. That is, the valence of Ni is calculated from $1×a+x×b+3×c+4×d+y×e−2×2=0$ $x=\{2×2−(1×a+3×c+4×d+y×e)\}/b$ wherein the valence of Ni is x, and the valence of M is y.

The "$D_{50}$" is a particle size at a point of 50% on a cumulative volume distribution curve which is drawn by obtaining the particle size distribution on the volume basis and taking the whole to be 100%, that is, a volume-based cumulative 50% size.

The "particle size distribution" is obtained from the frequency distribution and cumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The "specific surface area" is a value measured by a BET (Brunauer, Emmet, Teller) method. In the measurement of the specific surface area, nitrogen gas is used as an adsorption gas.

The expression "Li" means a Li element, not a Li metal simple substance, unless otherwise specified. The same applies to expressions of other elements such as Ni, Co, Mn, etc.

The composition analysis of a lithium-containing composite oxide is carried out by inductively-coupled plasma spectrometry (hereinafter referred to as ICP). Further, the ratio of elements in a lithium-containing composite oxide is a value with respect to the lithium-containing composite oxide before the first charging (also called activation treatment).

<Lithium-Containing Composite Oxide>

The lithium-containing composite oxide of the present invention is a compound represented by the following formula I (hereinafter, referred to also as "composite oxide (I)").

Formula I wherein (a+b+c+d+e) which is the total of a, b, c, d and e is 2.

a is the number of moles Li contained in the composite oxide (I). a/(b+c+d+e) is from 1.1 to 1.4, preferably from 1.13 to 1.37, more preferably from 1.15 to 1.35. When a/(b+c+d+e) falls within the above range, the discharge capacity of the lithium ion secondary battery having the composite oxide (I) is made to be large.

b is the number of moles Ni contained in the composite oxide (I). b/(b+c+d+e) is from 0.2 to 0.5, preferably from 0.25 to 0.5, more preferably from 0.3 to 0.47. When b/(b+c+d+e) falls within the above range, the discharge capacity of the lithium ion secondary battery having the composite oxide (I) is made to be large, and the discharge voltage is made to be high.

c is the number of moles Co contained in the composite oxide (I). c/(b+c+d+e) is from 0 to 0.25, preferably from 0.05 to 0.20. When c/(b+c+d+e) falls within the above range, the discharge capacity of the lithium ion secondary battery having the composite oxide (I) is made to be large, and the discharge voltage is made to be high. Further, when c/(b+c+d+e) is at least 0.05, the direct current resistance (hereinafter referred to also as "DCR") of the lithium ion secondary battery having the composite oxide (I) is low, whereby the rate characteristics are excellent.

d is the number of moles Mn contained in the composite oxide (I). d/(b+c+d+e) is from 0.3 to 0.6, preferably from 0.35 to 0.57, more preferably from 0.4 to 0.55. When d/(b+c+d+e) falls within the above range, the discharge capacity of the lithium ion secondary battery having the composite oxide (I) is made to be large, and the discharge voltage is made to be high.

The composite oxide (I) may contain another metal element M, as the case requires. Such another metal element M is at least one member selected from the group consisting of Na, Mg, Ti, Zr, Al, W and Mo. Another metal element M is preferably at least one member selected from the group consisting of Ti, Zr and Al, since the discharge capacity of the lithium ion secondary battery having the composite oxide (I) is easily made to be large, and the deterioration of the discharge voltage due to repetition of a charge and discharge cycle is easily suppressed.

e is the number of moles M contained in the composite oxide (I). e/(b+c+d+e) is from 0 to 0.1, preferably from 0 to 0.05, more preferably from 0 to 0.03.

The composite oxide (I) is a solid solution of $Li(Li_{1/3}Mn_{2/3})O_2$ (lithium excess phase) having a layered rock salt crystal structure with space group C2/m and $LiMeO_2$ (Me is at least one member selected from the group consisting of Ni, Co, Mn and M) having a layered rock salt crystal structure with space group R-3m. By an X-ray diffraction measurement, it can be confirmed that the composite oxide (I) has such crystal structures.

Typically, in the X-ray diffraction measurement, a peak of (020) plane assigned to the space group C2/m appears at 2θ=20 to 22 deg. Further, in the X-ray diffraction measurement, a peak of (003) plane assigned to the space group R-3m appears at 2θ=18 to 20 deg.

The composite oxide (I) has the valence of Ni of from 2.15 to 2.45, whereby the discharge capacity of the lithium ion secondary battery is made to be large, and the deterioration of the discharge voltage due to repetition of a charge and discharge cycle is suppressed.

When the valence of Ni is at least the lower limit value of the above range, the formation of another crystalline phase such as spinel and the formation of heterogeneous solid solution form are suppressed. As a result, the deterioration of the discharge voltage due to repetition of a charge and discharge cycle can be suppressed. Further, when the valence of Ni is at most the upper limit value in the above range, the amount of change of the valence of Ni in the charge and discharge of the lithium ion secondary battery will not be small. Thus, the deterioration of the discharge capacity of the lithium ion secondary battery having the composite oxide (I) can be suppressed.

For the above reason, the valence of Ni is preferably from 2.15 to 2.4, more preferably from 2.15 to 2.35.

(Process for Producing the Composite Oxide (I))

The composite oxide (I) is obtained by mixing a transition metal-containing compound essentially containing Ni and Mn and optionally containing Co and M with a lithium compound and firing the obtained mixture.

By controlling the charged ratio of Li, Ni, Co, Mn and M at the time of producing the composite oxide (I), the valence of Ni can be controlled to be within the above range.

As one embodiment of the process for producing the composite oxide (I), a process comprising the following steps (a) and (b) may, for example, be mentioned.

(a) A step of obtaining a transition metals-containing compound essentially containing Ni and Mn and optionally containing Co and M.

(b) A step of mixing the transition metals-containing compound and a lithium compound, and firing the obtained mixture to obtain a lithium-containing composite oxide.

Step (a):

In a case where the transition metals-containing compound contains M, the proportion of Ni, Co, Mn and M contained in the transition metals-containing compound is preferably the same as the proportion of Ni, Co, Mn and M contained in the composite oxide (I).

In a case where the transition metals-containing compound contains no M, and in the step (b), a compound containing M is further mixed, it is preferred to decide the proportion of Ni, Co and Mn contained in the transition metals-containing compound based on the proportion of Ni, Co, Mn and M to be contained in the composite oxide (I). Further, M is the same as M contained in the composite oxide (I).

The transition metals-containing compound may, for example, be a hydroxide or a carbonate, and is preferably the hydroxide with a view to easily suppressing the deterioration of the discharge capacity of the lithium ion secondary battery due to repetition of a charge and discharge cycle. The hydroxide includes an oxyhydroxide which is partially oxides.

The hydroxide may, for example, be prepared by an alkali coprecipitation method.

The alkali coprecipitation method is a method wherein an aqueous metal salt solution essentially containing Ni and Mn and optionally containing Co and M, and a pH adjusting liquid containing a strong alkali are continuously supplied to a reaction tank and mixed, and while keeping the pH in the mixture constant, hydroxides essentially containing Ni and Mn and optionally containing Co and M are precipitated.

The metal salts may, for example, be nitrates, acetates, chlorides or sulfates of the respective metal elements, and sulfates are preferred, since the material costs are relatively inexpensive, and excellent battery characteristics are thereby obtainable.

As the metal salts, a sulfate of Ni, a sulfate of Mn and a sulfate of Co are more preferred.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The ratio of Ni, Co, Mn and M in the aqueous metal salt solution is adjusted to be the same as the ratio of Ni, Co, Mn and M to be contained in the finally obtainable composite oxide (I).

The total concentration of the metal elements in the aqueous metal salt solution is preferably from 0.1 to 3 mol/kg, more preferably from 0.5 to 2.5 mol/kg. When the total concentration of the metal elements is at least the above lower limit value, the productivity will be excellent. When the total concentration of the metal elements is at most the above upper limit value, the metal salts can be sufficiently dissolved in water.

The aqueous metal salt solution may contain an aqueous medium other than water.

The aqueous medium other than water, may, for example, be methanol, ethanol, 1-propanol, 2-propanol, ethylene glycol, propylene glycol, diethylene glycol, dipropylene glycol, polyethylene glycol, butanediol or glycerine. The proportion of the aqueous medium other than water is preferably from 0 to 20 parts by mass, more preferably from 0 to 10 parts by mass, particularly preferably from 0 to 1 part by mass, per 100 parts by mass of water from the viewpoint of safety, environmental aspect, handling efficiency and costs.

The pH adjusting liquid is preferably an aqueous solution containing a strong alkali.

The strong alkali is preferably at least one member selected from the group consisting of sodium hydroxide, potassium hydroxide and lithium hydroxide.

To the mixed liquid, a complexing agent (aqueous ammonia or an aqueous ammonium sulfate solution) may be added to adjust the solubility of the metal elements.

The aqueous metal salt solution and the pH adjusting liquid are preferably mixed with stirring in the reaction tank.

The stirring device may, for example, be a three-one motor. The stirring blades may, for example, be anchor-type, propeller-type or paddle-type.

The reaction temperature is preferably from 20 to 80° C., more preferably from 25 to 60° C., with a view to accelerating the reaction.

Mixing of the aqueous metal salt solution and the pH adjusting liquid is preferably conducted in a nitrogen atmosphere or in an argon atmosphere, with a view to preventing oxidation of the hydroxides, and it is particularly preferably conducted in a nitrogen atmosphere from the viewpoint of costs.

During the mixing of the aqueous metal salt solution and the pH adjusting liquid, it is preferred to maintain the pH in the reaction tank to be a pH set within a range of from 10 to 12, with a view to letting the coprecipitation reaction proceed properly. When the mixing is conducted at a pH of at least 10, coprecipitates are deemed to be hydroxides.

As the method for precipitating hydroxides, two types may be mentioned, i.e. a method (hereinafter referred to as a concentration method) of carrying out the precipitation reaction while concentrating hydroxides by withdrawing the mixed liquid in the reaction tank through a filter (e.g. a filter cloth), and a method (hereinafter referred to as an overflow method) of carrying out the precipitation reaction while maintaining the concentration of hydroxides to be low by withdrawing the mixed liquid in the reaction tank, together with the hydroxides, without using a filter. The concentration method is preferred, with a view to narrowing the particle size distribution.

The hydroxides are preferably washed to remove impurity ions. The washing method may, for example, be a method of repeating pressure filtration and dispersion into distilled water. Such washing is preferably repeated until the electrical conductivity of the filtrate or the supernatant at the time when the hydroxides are dispersed in distilled water, becomes to be at most 50 mS/m, more preferably repeated until the electrical conductivity becomes to be at most 20 mS/m.

After the washing, the hydroxides may be dried as the case requires.

The drying temperature is preferably from 60 to 200° C., more preferably from 80 to 130° C. When the drying temperature is at least the above lower limit value, the drying time can be shortened. When the drying temperature is at most the above upper limit value, it is possible to prevent the progress of oxidation of the hydroxides.

The drying time may be properly set depending upon the amount of the hydroxides and is preferably from 1 to 300 hours, more preferably from 5 to 120 hours.

The specific surface area of the hydroxide is preferably from 3 to 60 m$^2$/g, more preferably from 5 to 50 m$^2$/g. When the specific surface area of the hydroxide is within the above range, the specific surface area of the cathode active material can be easily controlled to be within a preferred range. Here, the specific surface area of the hydroxide is a value measured after the hydroxide is dried at 120° C. for 15 hours.

$D_{50}$ of the hydroxide is preferably from 3 to 18 μm, more preferably from 3 to 15 μm, further preferably from 3 to 10 μm. When $D_{50}$ of the hydroxide is within the above range, $D_{50}$ of the cathode active material can be easily controlled to be within a preferred range.

Step (b):

The transition metals-containing compound and a lithium compound are mixed, and the obtained mixture is fired, whereby a lithium-containing composite oxide will be formed. To the mixture, a compound containing M may be further mixed.

The lithium compound is preferably one member selected from the group consisting of lithium carbonate, lithium hydroxide and lithium nitrate. Lithium carbonate is more preferred from the viewpoint of handling efficiency in the production step.

The mixing ratio of the lithium compound to the hydroxide is preferably a mixing ratio such that the ratio of the molar amount of Li contained in the lithium compound to the total molar amount of Ni, Co, Mn and M contained in the hydroxide would be from 1.1 to 1.4.

In a case where the transition metals-containing compound contains M, the ratio of Ni, Co, Mn and M contained in the mixture is preferably the same as the ratio of Ni, Co, Mn and M contained in the composite oxide (I).

In a case where the transition metals-containing compound contains no M, and a compound containing M is further mixed to the mixture, the ratio of Ni, Co, Mn and M contained in the mixture after mixing the compound containing M is preferably the same as the ratio of Ni, Co, Mn and M contained in the composite oxide (I).

The compound containing M is preferably at least one member selected from the group consisting of an oxide of M, a hydroxide of M, a carbonate of M, a nitrate of M, an acetate of M, a chloride of M and a fluoride of M. In the case of such a compound, in the step (b), impurities evaporate, and the impurities tend not to remain in the composite oxide (I).

The method for mixing the transition metals-containing compound and the lithium compound may, for example, be a method of using a rocking mixer, a Nauta mixer, a spiral mixer, a cutter mill or a V mixer.

The firing apparatus may, for example, be an electric furnace, a continuous firing furnace or a rotary kiln.

During the firing, the transition metals-containing compound is oxidized, and therefore, the firing is preferably conducted in the atmospheric air, and it is particularly preferred to carry out the firing while supplying air.

The supply rate of air is preferably from 10 to 200 mL/min., more preferably from 40 to 150 mL/min., per 1 L of the inner volume of the furnace.

By supplying air during the firing, the metal elements in the transition metals-containing compound will be sufficiently oxidized, whereby it is possible to obtain the composite oxide (I) having a high crystallinity and having a crystal structure with space group C2/m and a crystal structure with space group R-3m.

The firing temperature is from 800 to 1,100° C., preferably from 850 to 1,050° C., more preferably from 890 to 1,000° C. When the firing temperature is at least the lower limit value of the above range, the discharge capacity of the lithium ion secondary battery having the composite oxide (I) is easily made to be large, and the deterioration of the discharge voltage due to repetition of a charge and discharge cycle is easily suppressed.

The firing time is preferably from 4 to 40 hours, more preferably from 4 to 20 hours.

The firing may be one-stage firing or two-stage firing i.e. temporary firing followed by main firing. In a case where the two-stage firing is carried out, the main firing is carried out within the above mentioned range of the firing temperature.

Further, the temperature for the temporary firing is preferably from 500 to 700° C., more preferably from 500 to 650° C.

(Function and Mechanism)

The above-described composite oxide (I) is a lithium-containing composite oxide represented by the formula (I), namely lithium rich cathode active material wherein the valence of Ni is from 2.15 to 2.45, whereby a lithium ion secondary battery having a large discharge capacity wherein the deterioration of the discharge voltage due to repetition of a charge and discharge cycle is suppressed, can be obtained.

<Cathode Active Material>

The cathode active material of the present invention (hereinafter referred to also as "present cathode active material") may be the composite oxide (I) as it is or the composite oxide (I) which has a coating made of a compound containing at least one member selected from the group consisting of Zr, Ti, Al and F on a surface.

In the case of the cathode active material of the composite oxide (I) having a coating on a surface, the discharge capacity of the lithium ion secondary battery is easily made to be large, and the deterioration of the discharge voltage due to repetition of a charge and discharge cycle is easily suppressed.

The coating may, for example, be a compound containing at least one member selected from the group consisting of Zr, Ti, Al and F. The compound containing at least one member selected from the group consisting of Zr, Ti and Al may, for example, be an oxide, a sulfate or a carbonate. The compound containing F may, for example, be lithium fluoride, aluminum fluoride or zirconium fluoride.

The coating may be present on a surface of the composite oxide (I). The coating may be present on the entire surface of the composite oxide (I) or may be present on a part of the composite oxide (I).

The total content of Zr, Ti, Al and F in the coating is preferably from 0.1 to 5 mol %, more preferably from 0.3 to 3 mol %, per the composite oxide (I) (100 mol %).

The formation of a coating may, for example, be carried out by spraying a coating liquid containing at least one member selected from the group consisting of Zr, Ti, Al and F to the composite oxide (I), followed by firing to remove a solvent of the coating liquid, or carried out by dipping the composite oxide (I) in a coating liquid, followed by carrying out solid-liquid separation by filtration and firing to remove a solvent.

The present cathode active material is preferably secondary particles in which plural primary particles are aggregated.

$D_{50}$ of the secondary particles of the present cathode active material is preferably from 3 to 18 μm, more preferably from 3 to 15 μm, further preferably from 4 to 10 μm. When $D_{50}$ is within the above range, the discharge capacity of the lithium ion secondary battery can easily be made high.

The specific surface are of the present cathode active material is preferably from 0.5 to 5 m²/g, more preferably from 0.5 to 3 m²/g, further preferably from 1 to 2.5 m²/g. When the specific surface area is at least the above lower limit value, the discharge capacity of the lithium ion secondary battery can be easily made high. When the specific surface are is at most the above upper limit of the above range, the deterioration of the discharge voltage due to repetition of a charge and discharge cycle is easily suppressed.

The tap density of the present cathode active material is preferably from 1 to 3 g/cm³, more preferably from 1.3 to 2.5 g/cm³, further preferably from 1.5 to 2 g/cm³. When the tap density is within the above range, the density of the cathode active material in an electrode is made to be high, whereby the energy density of a cathode is made to be high.

(Function and Mechanism)

The above-described present cathode active material comprises the composite oxide (I), whereby a lithium ion secondary battery having a large discharge capacity wherein the deterioration of the discharge voltage due to repetition of a charge and discharge cycle is suppressed, can be obtained.

<Positive Electrode for Lithium Ion Secondary Battery>

The positive electrode for a lithium ion secondary battery of the present invention (hereinafter referred to as the present positive electrode) comprises the present cathode active material. Specifically, it has a cathode active material layer comprising the present active material, an electrically conductive material and a binder, formed on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present cathode active material, the electrically conductive material and the binder are dissolved or dispersed in a medium to obtain a slurry. The obtained slurry is applied to the positive electrode current collector, and the medium is removed e.g. by drying to form a layer of the cathode active material. As the case requires, the layer of the cathode active material may be pressed e.g. by roll pressing. The present positive electrode is obtained in such a manner.

Otherwise, the present cathode active material, the electrically conductive material and the binder are kneaded with a medium to obtain a kneaded product. The obtained kneaded product is pressed on the positive electrode current collector to obtain the present positive electrode.

(Function and Mechanism)

The above-described present positive electrode contains the present cathode active material, whereby it is possible to obtain a lithium ion secondary battery having a large discharge capacity wherein the deterioration of the discharge voltage due to repetition of a charge and discharge cycle is easily suppressed.

<Lithium Ion Secondary Battery>

The lithium ion secondary battery of the present invention (hereinafter referred to as the present battery) has the present positive electrode. Specifically, it comprises the present positive electrode, a negative electrode and a non-aqueous electrolyte.

(Negative Electrode)

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si.

As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used.

As the negative electrode current collector, a metal foil such as a nickel foil or a copper foil may be mentioned.

The negative electrode may be produced, for example, by the following method.

The anode active material, the electrically conductive material and the binder are dissolved or dispersed in a medium to obtain a slurry. The obtained slurry is applied to the negative electrode current collector, and the medium is removed e.g. by drying, followed by pressing to obtain the negative electrode.

(Non-Aqueous Electrolyte)

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). As the organic solvent, one type may be used alone, or two or more types may be used in combination.

As the inorganic solid electrolyte, a material having lithium ion conductivity may be used.

The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. As the polymer compound, one type may be used alone, or two or more types may be used in combination.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

(Function and Mechanism)

The above-described present battery has the present positive electrode, whereby the discharge capacity is large, and the deterioration of the discharge voltage due to repetition of a charge and discharge cycle is suppressed.

EXAMPLES

Now, the present invention will be described in detail with reference to Examples, but it should be understood that the present invention is by no means thereby restricted.

Ex. 1 to 15 are Examples of the present invention, and Ex. 16 to 21 are Comparative Examples.

(Composition Analysis)

The composition of the lithium-containing composite oxide ($Li_aNi_bCo_cMn_dM_eO_2$) was calculated from the following relationship formulae:

$$a=2v/(1+v)$$

$$b=w/\{50(1+v)\}$$

$$c=x/\{50(1+v)\}$$

$$d=y/\{50(1+v)\}$$

$$e=z/\{50(1+v)\},$$

wherein the molar ratio of Li/X (X is the total amount of Ni, Co, Mn and M) is v, the Ni amount of a hydroxide is w (mol %), the Co amount is x (mol %), the Mn amount is y (mol %), and the M amount of a compound containing M is z (mol %), and $$w+x+y+z=100, \text{ and } a+b+c+d+e=2.$$

(Particle Size)

The cathode active material was sufficiently dispersed in water by ultrasonic treatment, and the measurement was conducted by a laser diffraction/scattering type particle size distribution measuring apparatus (MT-3300EX manufactured by NIKKISO CO., LTD.), to obtain the frequency distribution and cumulative volume distribution curve, whereby the volume-based particle size distribution was obtained. From the obtained cumulative volume distribution curve, $D_{50}$ was obtained.

(Tap Density)

The tap density (unit: g/cm³) of the cathode active material was calculated from the following formula. In the following formula, V is a volume (unit: cm³) of a sample after tap. A volume of a sample (cathode active material) was measured by a graduated resin container (volume: 20 cm³) is set to a tap denser (KYT-4000K, manufactured by Seishin Enterprise Co., Ltd.), tap was carried out 700 times, the volume of the sample in the container was measured by the graduation of the container to obtain a value. m in the following formula is a mass (unit: g) of the sample and the mass of the sample added in the resin container.

$$\rho t = m/V$$

(Specific Surface Area)

The specific surface area of the cathode active material was calculated by a nitrogen adsorption BET method using a specific surface area measuring apparatus (HM model-1208, manufactured by Mountech Co., Ltd.). Degassing was carried out at 200° C. for 20 minutes.

(Production of Positive Electrode Sheet)

The cathode active material, acetylene black ("DENKA BLACK" (registered mark), manufactured by Denka Company Limited.) and a polyvinylidene fluoride solution (solvent: N-methylpyrrolidone) containing 12.1 mass % of a polyvinylidene fluoride ("KFL #1120", manufactured by KUREHA CORPORATION) were mixed, and N-methylpyrrolidone was further added to prepare a slurry. The mass ratio of the cathode active material, acetylene black and polyvinylidene fluoride was 90:5:5.

The slurry was applied on one side of an aluminum foil having an average thickness of 20 μm ("E-FOLL", manufactured by Toyo Aluminium K.K.) by means of a doctor blade. After drying at 120° C., roll pressing (0.3 t/cm) was carried out twice to prepare a positive electrode sheet.

(Production of Lithium Secondary Battery)

A stainless steel plate having a thickness of 1 mm and a metal lithium foil having a thickness of 500 μm (lithium foil, manufactured by THE HONJO CHEMICAL CORPORATION) were laminated to prepare a negative electrode. As a separator, a porous polypropylene having an average thickness of 25 μm (CELGARD (registered mark) #2500, manufactured by Polypore International, Inc.) was prepared.

As a non-aqueous electrolytic solution, a LiPF$_6$ solution at a concentration of 1 mol/dm³ was prepared. As the solvent of the non-aqueous electrolytic solution, a mixed liquid of ethylene carbonate and diethyl carbonate, which has a volume ratio of 1:1 was used.

Using the positive electrode, the negative electrode, the separator and the non-aqueous electrolytic solution, a stainless steel simple sealed cell type lithium secondary battery was assembled in an argon globe box.

(Initial Discharge Capacity)

A lithium secondary battery was charged by constant current and constant voltage to 4.5 V with a load current of 20 mA per 1 g of the cathode active material. Then, the lithium secondary battery was discharged to 2.5V by constant current at a load current of 200 mA per 1 g of the cathode active material. The second time charging and discharging was carried out under the same condition as in the first charging and the first discharging, except that the load current for discharging was change to 40 mA per 1 g of the cathode active material.

(Initial DCR)

After the initial charging and discharging, a lithium secondary battery was charged to 4.5 V by constant current and constant voltage so as to be full charged state. In this full charged state, a voltage drop value (V) after 10 seconds when discharged at a load current (I) of 20 mA, 100 mA, 200 mA, 400 mA or 800 mA per 1 g of the cathode active material, was measured. V in each I was plotted, the plot was linear approximated by the least squares method to obtain an inclination of a linear line as a direct current resistance (initial DCR).

(Voltage Drop)

A charge and discharge cycle was carried out 50 cycles that constant current and constant voltage charging was carried out to 4.5 V with a load current of 200 mA per 1 g of the cathode active material, and then constant current discharging was carried out to 2.5 V with a load current of 200 mA per 1 g of the cathode active material. The voltage drop is the difference between the discharge voltage of 1st cycle and the discharge voltage of 50th cycle.

Ex. 1

The hydroxide obtained by the coprecipitation method and having the composition shown in Table 1 and lithium carbonate (MIC grade, manufactured by SQM) were weighed so that the molar ratio (Li/X) of Li to X (X is Ni, Co and Mn) would be a value shown in Table 1, and mixed.

The obtained mixture was fired in an electric furnace under air atmosphere at 890° C. for 8 hours while supplying air, to obtain a lithium-containing composite oxide as a cathode active material. Results are shown in Table 1 and Table 2.

Ex. 2 to 8

A lithium-containing composite oxide was obtained as a cathode active material in the same manner as in Ex. 1, except that the hydroxide and Li/X in Ex. 1 were changed to the hydroxide and Li/X shown in Table 1. Results are shown in Table 1 and Table 2.

Ex. 9

The hydroxide obtained by the coprecipitation method and having the composition shown in Table 1 and lithium carbonate (MIC grade, manufactured by SQM) were weighed so that the Li/X would be a value shown in Table 1, and a zirconium oxide powder (tradename: PCS, manufactured by Nippon Denko Co., Ltd.) was weighed so as to be an amount of 0.5 mol % in the metal content (excluding Li) of the lithium composite oxide. They were mixed.

The obtained mixture was fired in an electrical furnace under air atmosphere at 890° C. for 8 hours while supplying air, to obtain a lithium-containing composite oxide as a cathode active material. Results are shown in Table 1 and Table 2.

Ex. 10

A lithium-containing composite oxide was obtained as a cathode active material in the same manner as in Ex. 9, except that the oxide zirconium powder in Ex. 9 was changed to a titanium oxide powder (tradename: AMT-100, manufactured by Tayca Corporation). Results are shown in Table 1 and Table 2.

Ex. 11

A lithium-containing composite oxide was obtained as a cathode active material in the same manner as in Ex. 9, except that the oxide zirconium powder in Ex. 9 was changed to an aluminum hydroxide powder (tradename: C-301, manufactured by Sumitomo Chemical Co., Ltd.). Results are shown in Table 1 and Table 2.

Ex. 12

A lithium-containing composite oxide was obtained in the same manner as in Ex. 10, except that the firing temperature was changed to 910° C. A Zr-containing aqueous solution (Tradename: BAYCOAT 20, manufactured by Nippon Light Metal Company, Ltd.) to be 5 mass % of the mass ratio to the lithium-containing composite oxide was blown to the lithium-containing composite oxide so that the amount of Zr with which the lithium-containing composite oxide was coated would be 0.5 mol % per the lithium-containing composite oxide (100 mol %), and mixed. The obtained mixture was fired in an electric furnace at 500° C. for 8 hours under air atmosphere while supplying air, to obtain a cathode active material. Results are shown in Table 1 and Table 2.

Ex. 13

A cathode active material was obtained in the same manner as in Ex. 12, except that the Zr-containing aqueous solution in Ex. 12 was changed to a Ti-containing aqueous solution (tradename: ORGATIX TC-315, manufactured by Matsumoto Fine Chemical Co., Ltd.). Results are shown in Table 1 and Table 2.

Ex. 14

A cathode active material was obtained in the same manner as in Ex. 12, except that the Zr-containing aqueous solution in Ex. 12 was changed to an Al-containing aqueous solution (tradename: Takiceram K-ML16, manufactured by TAKI Chemical Co., Ltd.). Results are shown in Table 1 and Table 2.

Ex. 15

A cathode active material was obtained in the same manner as in Ex. 12, except that the Zr-containing aqueous solution in Ex. 12 was changed to an ammonium fluoride aqueous solution. Results are shown in Table 1 and Table 2.

Ex. 16 to 21

A lithium-containing composite oxide was obtained as a cathode active material in the same manner as in Ex. 1 except that the hydroxide and Li/X in Ex. 1 were changed to a hydroxide and Li/X in Table 1. Results are shown in Table 1 and Table 2.

TABLE 1

| | Composition of hydroxide [mol %] | | | | Firing Condition | | Firing temperature [° C.] | Lithium-containing composite oxide $Li_aNi_bCo_cMn_dMeO_2$ (a + b + c + d + e = 2) | | | | | Valence of Ni |
|---|---|---|---|---|---|---|---|---|---|---|---|---|---|
| Ex. | Ni | Co | Mn | Li/X | Type of M | M [mol %] | | a | b | c | d | e | |
| 1 | 34.0 | 20.0 | 46.0 | 1.20 | — | — | 890 | 1.091 | 0.309 | 0.182 | 0.418 | 0.000 | 2.24 |
| 2 | 34.0 | 20.0 | 46.0 | 1.24 | — | — | 890 | 1.107 | 0.304 | 0.179 | 0.411 | 0.000 | 2.35 |
| 3 | 40.0 | 10.0 | 50.0 | 1.20 | — | — | 890 | 1.091 | 0.364 | 0.091 | 0.455 | 0.000 | 2.25 |
| 4 | 30.0 | 20.0 | 50.0 | 1.28 | — | — | 890 | 1.123 | 0.263 | 0.175 | 0.439 | 0.000 | 2.27 |
| 5 | 38.0 | 20.0 | 42.0 | 1.16 | — | — | 890 | 1.074 | 0.352 | 0.185 | 0.389 | 0.000 | 2.32 |
| 6 | 38.0 | 20.0 | 42.0 | 1.20 | — | — | 890 | 1.091 | 0.345 | 0.182 | 0.382 | 0.000 | 2.42 |
| 7 | 45.0 | 0.0 | 55.0 | 1.24 | — | — | 890 | 1.107 | 0.402 | 0.000 | 0.491 | 0.000 | 2.31 |
| 8 | 45.0 | 0.0 | 55.0 | 1.28 | — | — | 890 | 1.123 | 0.395 | 0.000 | 0.482 | 0.000 | 2.40 |
| 9 | 33.8 | 19.9 | 45.8 | 1.20 | Zr | 0.5 | 890 | 1.091 | 0.308 | 0.181 | 0.416 | 0.005 | 2.22 |
| 10 | 33.8 | 19.9 | 45.8 | 1.20 | Ti | 0.5 | 890 | 1.091 | 0.308 | 0.181 | 0.416 | 0.005 | 2.22 |
| 11 | 33.8 | 19.9 | 45.8 | 1.20 | Al | 0.5 | 890 | 1.091 | 0.308 | 0.181 | 0.416 | 0.005 | 2.24 |
| 12 | 33.8 | 19.9 | 45.8 | 1.20 | Ti | 0.5 | 910 | 1.091 | 0.308 | 0.181 | 0.416 | 0.005 | 2.22 |
| 13 | 33.8 | 19.9 | 45.8 | 1.20 | Ti | 0.5 | 910 | 1.091 | 0.308 | 0.181 | 0.416 | 0.005 | 2.22 |
| 14 | 33.8 | 19.9 | 45.8 | 1.20 | Ti | 0.5 | 910 | 1.091 | 0.308 | 0.181 | 0.416 | 0.005 | 2.22 |
| 15 | 33.8 | 19.9 | 45.8 | 1.20 | Ti | 0.5 | 910 | 1.091 | 0.308 | 0.181 | 0.416 | 0.005 | 2.22 |
| 16 | 30.0 | 20.0 | 50.0 | 1.16 | — | — | 890 | 1.074 | 0.278 | 0.185 | 0.463 | 0.000 | 1.87 |
| 17 | 30.0 | 20.0 | 50.0 | 1.20 | — | — | 890 | 1.091 | 0.273 | 0.182 | 0.455 | 0.000 | 2.00 |
| 18 | 30.0 | 20.0 | 50.0 | 1.24 | — | — | 890 | 1.107 | 0.268 | 0.179 | 0.446 | 0.000 | 2.13 |
| 19 | 38.0 | 20.0 | .0 | 1.28 | — | — | 890 | 1.123 | 0.333 | 0.175 | 0.368 | 0.000 | 2.63 |
| 20 | 29.0 | 29.0 | .0 | 1.20 | — | — | 890 | 1.091 | 0.264 | 0.264 | 0.382 | 0.000 | 2.24 |
| 21 | 29.0 | 29.0 | 42.0 | 1.24 | — | — | 890 | 1.107 | 0.259 | 0.259 | 0.375 | 0.000 | 2.38 |

TABLE 2

| | Lithium-containing composite oxide | | | | | | |
|---|---|---|---|---|---|---|---|
| | $Li_a Ni_b Co_c Mn_d M_e O_2$ (a + b + c + d + e = 2) | | | | | | [mol/%] |
| Ex. | a/(b + c + d + e) | b/(b + c + d + e) | c/(b + c + d + e) | d/(b + c + d + e) | e/(b + c + d + e) | Type | |
| 1 | 1.20 | 0.340 | 0.200 | 0.460 | 0.000 | — | — |
| 2 | 1.24 | 0.340 | 0.200 | 0.460 | 0.000 | — | — |
| 3 | 1.20 | 0.400 | 0.100 | 0.500 | 0.000 | — | — |
| 4 | 1.28 | 0.300 | 0.200 | 0.500 | 0.000 | — | — |
| 5 | 1.16 | 0.380 | 0.200 | 0.420 | 0.000 | — | — |
| 6 | 1.20 | 0.380 | 0.200 | 0.420 | 0.000 | — | — |
| 7 | 1.24 | 0.450 | 0.000 | 0.550 | 0.000 | — | — |
| 8 | 1.28 | 0.450 | 0.000 | 0.550 | 0.000 | — | — |
| 9 | 1.20 | 0.338 | 0.199 | 0.458 | 0.005 | — | — |
| 10 | 1.20 | 0.338 | 0.199 | 0.458 | 0.005 | — | — |
| 11 | 1.20 | 0.338 | 0.199 | 0.458 | 0.005 | — | — |
| 12 | 1.20 | 0.338 | 0.199 | 0.458 | 0.005 | Zr | 0.5 |
| 13 | 1.20 | 0.338 | 0.199 | 0.458 | 0.005 | Ti | 0.5 |
| 14 | 1.20 | 0.338 | 0.199 | 0.458 | 0.005 | Al | 0.5 |
| 15 | 1.20 | 0.338 | 0.199 | 0.458 | 0.005 | F | 0.5 |
| 16 | 1.16 | 0.300 | 0.200 | 0.500 | 0.000 | — | — |
| 17 | 1.20 | 0.300 | 0.200 | 0.500 | 0.000 | — | — |
| 18 | 1.24 | 0.300 | 0.200 | 0.500 | 0.000 | — | — |
| 19 | 1.28 | 0.380 | 0.200 | 0.420 | 0.000 | — | — |
| 20 | 1.20 | 0.290 | 0.290 | 0.420 | 0.000 | — | — |
| 21 | 1.24 | 0.290 | 0.290 | 0.420 | 0.000 | — | — |

| | Cathode active material | | | Lithium secondary battery | | |
|---|---|---|---|---|---|---|
| | $D_{50}$ [μm] | Tap density | Specific surface area [m²/g] | Voltage drop [V] | Initial discharge capacity [mAh/g] | Initial DCR [Ω] |
| 1 | 4.8 | 1.61 | 2.09 | 0.116 | 188.2 | 11.2 |
| 2 | 4.8 | 1.60 | 1.74 | 0.115 | 188.9 | 10.9 |
| 3 | 5.4 | 1.74 | 2.09 | 0.123 | 191.6 | 16.6 |
| 4 | 5.0 | 1.64 | 2.05 | 0.128 | 190.0 | 12.2 |
| 5 | 4.6 | 1.70 | 1.80 | 0.098 | 189.9 | 9.8 |
| 6 | 4.6 | 1.61 | 1.32 | 0.097 | 188.6 | 10.2 |
| 7 | 5.3 | 1.75 | 2.04 | 0.107 | 194.1 | 19.6 |
| 8 | 5.3 | 1.74 | 1.41 | 0.105 | 192.0 | 19.0 |
| 9 | 4.9 | 1.62 | 2.14 | 0.092 | 188.2 | 10.3 |
| 10 | 4.9 | 1.54 | 2.21 | 0.090 | 190.9 | 12.0 |
| 11 | 4.9 | 1.52 | 2.31 | 0.095 | 191.7 | 11.6 |
| 12 | 4.9 | 1.59 | 2.06 | 0.077 | 189.6 | 8.6 |
| 13 | 4.8 | 1.65 | 2.00 | 0.086 | 191.4 | 10.0 |
| 14 | 4.9 | 1.65 | 1.99 | 0.081 | 190.4 | 9.0 |
| 15 | 4.9 | 1.62 | 1.82 | 0.085 | 192.1 | 9.5 |
| 16 | 5.5 | 1.63 | 2.63 | 0.194 | 181.9 | 17.9 |
| 17 | 5.1 | 1.59 | 2.67 | 0.150 | 185.5 | 12.6 |
| 18 | 5.0 | 1.61 | 2.40 | 0.130 | 188.2 | 11.7 |
| 19 | 5.3 | 1.48 | 0.78 | 0.107 | 185.7 | 10.7 |
| 20 | 5.1 | 1.51 | 2.22 | 0.117 | 183.8 | 7.7 |
| 21 | 5.2 | 1.52 | 2.04 | 0.117 | 184.5 | 8.5 |

In Ex. 1 to 15, the discharge capacity was large, and the deterioration of the discharge voltage due to repetition of a charge and discharge cycle was suppressed, since the composite oxide was represented by the formula I, and the valence of Ni was from 2.15 to 2.45. Particularly, in Ex. 9 to 11 where the lithium-containing composite oxide contained another metal element M and in Ex. 12 to 15 where the lithium-containing composite oxide had a coating on a surface, the deterioration of the discharge voltage due to repetition of a charge and discharge cycle was sufficiently suppressed. Further, in Ex. 7 and 8 where the lithium-containing composite oxide contained no Co, DCR was high.

In Ex. 16 to 18, the discharge capacity was small, and the deterioration of the discharge voltage due to repetition of a charge and discharge cycle was large, since the valence of Ni was less than 2.15.

In Ex. 19, the discharge capacity was small, since the valence of Ni exceeded 2.45.

In Ex. 20 and 21, the discharge capacity was small, since c/(b+c+d+e) exceeded 0.25.

INDUSTRIAL APPLICABILITY

By the lithium-containing composite oxide of the present invention, it is possible to obtain a lithium ion secondary battery having a large discharge capacity, whereby the deterioration of the discharge voltage due to repetition of a charge and discharge cycle is suppressed.

The entire disclosure of Japanese Patent Application No. 2015-117266 filed on Jun. 10, 2015 including specification, claims and summary is incorporated herein by reference in its entirety.

What is claimed is:

1. A lithium-containing composite oxide, having a formula I:

$$Li_a Ni_b Co_c Mn_d M_e O_2 \qquad (I),$$

wherein

M is Na, Mg, Ti, Zr, Al, W, and/or Mo, $a+b+c+d+e=2$, $1.1 \leq a/(b+c+d+e) \leq 1.24$, $0.3 \leq b/(b+c+d+e) \leq 0.47$, $0.1 \leq c/(b+c+d+e) \leq 0.25$, $0.3 \leq d/(b+c+d+e) \leq 0.6$, and $0 \leq e/(b+c+d+e) \leq 0.1$, and wherein a valence of Ni is in a range of from 2.15 to 2.45, a valence of Li is 1, a valence of Co is 3, a valence of Mn is 4, a valence of Na is 1, a valence of Mg is 2, a valence of Ti is 4, a valence of Zr is 4, a valence of Al is 3, a valence of W is 6, a valence of Mo is 6, and a valence of oxygen (O) is −2, and wherein, in an X-ray diffraction measurement of the lithium-containing composite oxide, a (020) plane peak assigned to a C2/m space group appears at a 2θ in a range of from 20 to 22°, and a (003) plane peak assigned to an R-3m space group appears at a 2θ in a range of from 18 to 20°.

2. The composite oxide of claim 1, wherein, in the formula I, M is Ti, Zr, and/or Al.

3. A cathode active material, comprising:
the composite oxide of claim 1.

4. The material of claim 3, further comprising:
a coating comprising Zr, Ti, Al, and/or F, and formed on a surface of the lithium-containing composite oxide.

5. The material of claim 3, comprising a secondary particle comprising a plurality of primary particles and having a $D_{50}$ value in a range of from 3 to 10 μm.

6. The material of claim 3, having a specific surface area in a range of from 0.5 to 5 m²/g.

7. A positive electrode suitable for a lithium ion secondary battery, the electrode comprising:
the cathode active material of claim 3;
an electrically conductive material; and
a binder.

8. A lithium ion secondary battery, comprising:
the positive electrode of claim 7;
a negative electrode; and
a non-aqueous electrolyte.

9. The composite oxide of claim 1,
wherein M is Ti, Zr, and/or Al, and
$1.1 \leq a/(b+c+d+e) \leq 1.24$, and
$0 \leq e/(b+c+d+e) \leq 0.005$.

10. A cathode active material, comprising:
the composite oxide of claim 9.

11. The material of claim 10, further comprising:
a coating comprising Zr, Ti, Al, and/or F, and formed on a surface of the lithium-containing composite oxide.

12. The material of claim 10, comprising a secondary particle comprising a plurality of primary particles and having a $D_{50}$ value in a range of from 3 to 10 μm.

13. The material of claim 10, having a specific surface area in a range of from 0.5 to 5 m²/g.

14. A positive electrode suitable for a lithium ion secondary battery, the electrode comprising:
the cathode active material of claim 10;
an electrically conductive material; and
a binder.

15. A lithium ion secondary battery, comprising:
the positive electrode of claim 14;
a negative electrode; and
a non-aqueous electrolyte.

16. The composite oxide of claim 1, wherein, in the formula I, M comprises Ti.

17. The composite oxide of claim 1, wherein, in the formula I, M comprises Zr.

18. The composite oxide of claim 1, wherein, in the formula I, M comprises Al.

19. The composite oxide of claim 1, wherein, in the formula I, M comprises Mo.

20. The composite oxide of claim 1, wherein, in the formula I, e is 0.

* * * * *